(12) United States Patent
Day et al.

(10) Patent No.: US 8,643,624 B2
(45) Date of Patent: Feb. 4, 2014

(54) CAPACITIVE SENSING USING A SEGMENTED COMMON VOLTAGE ELECTRODE OF A DISPLAY

(75) Inventors: Shawn P. Day, San Jose, CA (US); Bob Lee Mackey, San Jose, CA (US); Joseph Kurth Reynolds, Mountain View, CA (US)

(73) Assignee: Synaptics Incorporated, San Jose, CA (US)

( * ) Notice: Subject to any disclaimer, the term of this patent is extended or adjusted under 35 U.S.C. 154(b) by 525 days.

(21) Appl. No.: 12/726,322

(22) Filed: Mar. 17, 2010

(65) Prior Publication Data

US 2010/0238134 A1 Sep. 23, 2010

Related U.S. Application Data

(60) Provisional application No. 61/161,338, filed on Mar. 18, 2009.

(51) Int. Cl.
*G06F 3/045* (2006.01)

(52) U.S. Cl.
USPC .......................................................... 345/174

(58) Field of Classification Search
USPC ................................. 345/173–184, 87–101; 178/18.01–19.03; 349/12
See application file for complete search history.

(56) References Cited

U.S. PATENT DOCUMENTS

| | | | |
|---|---|---|---|
| 5,093,655 A * | 3/1992 | Tanioka et al. | 345/96 |
| 5,392,058 A | 2/1995 | Tagawa | |
| 5,534,892 A | 7/1996 | Tagawa | |
| 5,896,120 A | 4/1999 | Iguchi et al. | |
| 6,219,113 B1 * | 4/2001 | Takahara | 349/42 |
| 6,239,788 B1 | 5/2001 | Nohno et al. | |
| 6,560,276 B1 | 5/2003 | Long et al. | |
| 7,031,886 B1 | 4/2006 | Hargreaves | |
| 7,633,566 B2 | 12/2009 | Utsunomiya et al. | |
| 7,792,220 B2 | 9/2010 | Alderson et al. | |

(Continued)

FOREIGN PATENT DOCUMENTS

| | | |
|---|---|---|
| CN | 101051256 | 10/2007 |
| CN | 101051256 A | 10/2007 |

(Continued)

OTHER PUBLICATIONS

Dialog Machine Translation of Patent No. CN1940842, which is equivalent to WO-2007/012256. Jul. 12, 2006.*

(Continued)

*Primary Examiner* — Liliana Cerullo (57) ABSTRACT

An integrated display and touch sensor device comprises a plurality of display pixels and a processing system communicatively coupled with a plurality of common voltage electrode segments and with a plurality of receiver sensor electrodes. The plurality of display pixels is configured for displaying information on the display. The processing system is configured for driving a voltage transition onto a common voltage electrode segment of the plurality of common voltage electrode segments. The voltage transition provides a common voltage for refreshing at least one display pixel of the plurality of display pixels, and generates a first electrical signal on at least one receiver sensor electrode of the plurality of receiver sensor electrodes. The processing system is also configured for acquiring a first measurement of a capacitive coupling between the driven common voltage electrode segment and the at least one receiver sensor electrode by measuring the first electrical signal.

25 Claims, 7 Drawing Sheets

(56) References Cited

U.S. PATENT DOCUMENTS

| | | |
|---|---|---|
| 8,027,417 B2 | 9/2011 | Jia et al. |
| 8,040,326 B2 | 10/2011 | Hotelling et al. |
| 8,174,589 B2 | 5/2012 | Ise |
| 2004/0095336 A1 | 5/2004 | Hong |
| 2004/0217945 A1 | 11/2004 | Miyamoto et al. |
| 2005/0135492 A1 | 6/2005 | Jia et al. |
| 2006/0012575 A1 | 1/2006 | Knapp et al. |
| 2006/0114247 A1 | 6/2006 | Brown |
| 2007/0182723 A1 | 8/2007 | Imai et al. |
| 2007/0262966 A1 | 11/2007 | Nishimura et al. |
| 2008/0018581 A1 | 1/2008 | Park et al. |
| 2008/0048989 A1 | 2/2008 | Yoon et al. |
| 2008/0055267 A1 | 3/2008 | Wu et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0144743 A1 | 6/2008 | Alderson et al. |
| 2008/0150901 A1 | 6/2008 | Lowles et al. |
| 2008/0180407 A1 | 7/2008 | Utsunomiya et al. |
| 2008/0309625 A1 | 12/2008 | Krah et al. |
| 2008/0309627 A1 | 12/2008 | Hotelling et al. |
| 2008/0309628 A1 | 12/2008 | Krah et al. |
| 2009/0009194 A1 | 1/2009 | Seguine |
| 2009/0079707 A1 | 3/2009 | Kaehler et al. |
| 2009/0160461 A1 | 6/2009 | Zangl et al. |
| 2009/0195511 A1 | 8/2009 | Cites et al. |
| 2009/0256818 A1 | 10/2009 | Noguchi et al. |
| 2010/0001973 A1 | 1/2010 | Hotelling et al. |
| 2010/0019780 A1 | 1/2010 | Bulea |
| 2010/0045635 A1 | 2/2010 | Soo |
| 2010/0053380 A1 | 3/2010 | Ise |
| 2010/0060591 A1 | 3/2010 | Yousefpor et al. |
| 2010/0066692 A1 | 3/2010 | Noguchi et al. |
| 2010/0085324 A1 | 4/2010 | Noguchi et al. |
| 2010/0110040 A1 | 5/2010 | Kim et al. |
| 2010/0182273 A1 | 7/2010 | Noguchi et al. |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0214262 A1 | 8/2010 | Ishizaki et al. |
| 2010/0225612 A1 | 9/2010 | Ishizaki et al. |
| 2010/0265210 A1 | 10/2010 | Nakanishi et al. |
| 2010/0289765 A1 | 11/2010 | Noguchi et al. |
| 2010/0295804 A1 | 11/2010 | Takeuchi et al. |
| 2010/0295824 A1 | 11/2010 | Noguchi et al. |
| 2010/0302202 A1 | 12/2010 | Takeuchi et al. |
| 2010/0309162 A1 | 12/2010 | Nakanishi et al. |
| 2010/0328239 A1 | 12/2010 | Harada et al. |
| 2010/0328255 A1 | 12/2010 | Ishizaki et al. |
| 2010/0328256 A1 | 12/2010 | Harada et al. |
| 2010/0328257 A1 | 12/2010 | Noguchi et al. |
| 2010/0328259 A1 | 12/2010 | Ishizaki et al. |
| 2010/0328274 A1 | 12/2010 | Noguchi et al. |
| 2010/0328291 A1 | 12/2010 | Ishizaki et al. |
| 2011/0042152 A1 | 2/2011 | Wu |
| 2011/0050585 A1 | 3/2011 | Hotelling et al. |
| 2011/0102361 A1 | 5/2011 | Philipp |
| 2011/0210939 A1 | 9/2011 | Reynolds et al. |
| 2011/0210940 A1 | 9/2011 | Reynolds |
| 2011/0210941 A1 | 9/2011 | Reynolds et al. |
| 2011/0267305 A1 | 11/2011 | Shahparnia et al. |

FOREIGN PATENT DOCUMENTS

| | | |
|---|---|---|
| EP | 1892605 | 2/2008 |
| EP | 1936479 | 6/2008 |
| EP | 2330493 | 6/2011 |
| JP | 2006-106853 | 4/2006 |
| JP | 2007-334606 | 12/2007 |
| JP | 2008-090623 | 4/2008 |
| JP | 2010-072581 | 4/2010 |
| KR | 10-2008-0012594 | 2/2008 |
| KR | 10-2010-0007717 | 1/2010 |
| TW | 200945147 | 11/2009 |
| WO | WO-01/27868 | 4/2001 |
| WO | WO03019346 | 3/2003 |
| WO | WO-2004/046905 | 6/2004 |
| WO | WO-2006/054585 | 5/2006 |
| WO | WO-2007/003108 | 1/2007 |
| WO | WO-2007/012256 | 2/2007 |
| WO | WO-2007/102238 | 9/2007 |
| WO | WO-2008/050507 | 5/2008 |
| WO | WO-2010/009655 | 1/2010 |
| WO | WO-2010/137727 | 12/2010 |

OTHER PUBLICATIONS

Partial Human Translation of Wipo Publication WO-2007/012256-A1, Chen et al., Published Jan. 2, 2007.*

ISA/KR, International Search Report and Written Opinion for International Application No. PCT/US2010/027735, 8 pages, Oct. 29, 2010.

"Office Action for U.S. Appl. No. 12/772,012, Mailed Aug. 15, 2013, 13 pages".

"Office Action for U.S. Appl. No. 13/034,696, Mailed May 31, 2013, 22 pages".

"Office Action, U.S. Appl. No. 13/034,679 mailed Jun. 26, 2013, 25 pages,".

Office Action for U.S. Appl. No. 13/034,696, Mailed Sep. 20, 2013, 24 pages.

* cited by examiner

DRIVE A VOLTAGE TRANSITION ONTO A COMMON VOLTAGE ELECTRODE SEGMENT OF A PLURALITY OF COMMON VOLTAGE ELECTRODE SEGMENTS, WHEREIN THE VOLTAGE TRANSITION PROVIDES A COMMON VOLTAGE FOR REFRESHING AT LEAST ONE DISPLAY PIXEL OF A PLURALITY OF DISPLAY PIXELS, AND WHEREIN THE VOLTAGE TRANSITION GENERATES A FIRST ELECTRICAL SIGNAL ON AT LEAST ONE RECEIVER SENSOR ELECTRODE OF A PLURALITY OF RECEIVER SENSOR ELECTRODES.
710

↓

ACQUIRE A FIRST MEASUREMENT OF A CAPACITIVE COUPLING BETWEEN THE COMMON VOLTAGE ELECTRODE SEGMENT AND THE AT LEAST ONE RECEIVER SENSOR ELECTRODE BY MEASURING THE FIRST ELECTRICAL SIGNAL.
720

↓

DETERMINE POSITIONAL INFORMATION RELATED TO AN INPUT OBJECT PROXIMATE TO THE DISPLAY BASED ON THE FIRST MEASUREMENT.
730

FIG. 7

CAPACITIVE SENSING USING A SEGMENTED COMMON VOLTAGE ELECTRODE OF A DISPLAY

CROSS REFERENCE TO RELATED U.S. APPLICATION

This application claims priority to the provisional patent application Ser. No. 61/161,338, entitled "CAPACITIVE SENSING USING A SEGMENTED COMMON VOLTAGE ELECTRODE OF A LIQUID CRYSTAL DISPLAY," with filing date Mar. 18, 2009 and assigned to the assignee of the present invention, which is herein incorporated by reference in its entirety.

BACKGROUND

Displays, such as Liquid Crystal Displays and Organic Light Emitting Diode displays, are used in many of electronic devices in order to display graphics, text, pictures, and the like which may be generically considered as the display of information. In many uses, capacitive sensors, such as capacitive touch panels, are implemented in conjunction with these displays to form capacitive touch screens. A user can interact with a capacitive sensor arranged over the display to select, manipulate, or take some action with regard to the displayed information or make an input or selection with respect to an electronic device on which the capacitive sensor is implemented. One such example is a capacitive touch panel that covers a display of a tablet personal computer. Another is the capacitive touch panel that covers a display of a digital camera. Still another example is a capacitive touch panel that covers a display of a smart phone.

It is appreciated that the conventional construction of many such capacitive touch screens involves fabricating a display (such as an LCD), consisting of multiple layers of material, and then adding an additional substrate to the stack of the display layers to implement a capacitive sensor on top of the display. For example, and with respect to an LCD, this typically involves applying an optically clear adhesive to attach a sheet of glass or other clear substrate to the top surface of the LCD, the top surface being the surface through which a user views the LCD. The capacitive sensor is implemented on this additional layer, such as by patterning optically clear electrodes on it.

BRIEF DESCRIPTION OF THE DRAWINGS

The accompanying drawings, which are incorporated in and form a part of the Description of Embodiments, illustrate various embodiments of the present invention and, together with the Description of Embodiments, serve to explain principles discussed below. The drawings referred to in this Brief Description of Drawings should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail so as to not unnecessarily obscure aspects of the described embodiments.

Overview of Discussion

Typical conventional capacitive touch screens are constructed from a separate display and capacitive sensor, which are then joined together such as by attaching the capacitive sensor to the display with an optically clear adhesive. Additionally, in typical conventional approaches, the display, such as a Liquid Crystal Display (LCD), contains a common voltage (Vcom) electrode that is separate from the drive electrodes for the capacitive sensor.

As an example, some capacitive implementations utilize transcapacitive sensing methods based on the capacitive coupling between electrodes. Transcapacitive sensing methods are sometimes also referred to as "mutual capacitance sensing methods." In one embodiment, a transcapacitive sensing method operates by detecting the electric field coupling one or more transmitting (drive) electrodes with one or more receiving electrodes. Proximate objects may cause changes in the electric field, and produce detectable changes in the transcapacitive coupling. Sensor electrodes may drive as well as receive, either simultaneously or in a time multiplexed manner.

Sensor electrodes that drive are sometimes referred to as the "transmitting sensor electrodes," "driving sensor electrodes," "transmitters," "drive electrodes" or "drivers"—at least for the duration when they are driving. Other names may also be used, including contractions or combinations of the earlier names (e.g., "driving electrodes" and "driver electrodes." Sensor electrodes that receive are sometimes referred to as "receiving sensor electrodes," "receiver electrodes," or "receivers"—at least for the duration when they are receiving. Similarly, other names may also be used, including contractions or combinations of the earlier names.

Transcapacitive sensing schemes may detect changes in capacitive coupling between drive electrodes and receiver sensor electrodes when an object such as a human digit or a stylus is brought near. When the sensor comprises multiple drive electrodes or multiple receiver sensor electrodes, multiple capacitive couplings are formed in a spatially distributed fashion. A set of measurements of such multiple capacitive couplings is often referred to as a "frame", an "image", or a "capacitive image". Such an image represents the magnitudes of the capacitive couplings during a particular period of time. Successive images represent the magnitudes of the capacitive couplings during successive periods of time. Such successive images can be used to track the motions of objects in time as they move throughout a sensing region. The rate at which successive images are captured is known as the capacitive sensor frame rate.

Herein, an integrated display and touch sensor device is described. As will be described, the Vcom electrode of the display of this device is segmented and is employed for a dual use as both the Vcom electrode of the display and as the drive electrodes for a transcapacitive sensor. This technique of segmenting the Vcom electrode and also using it as the drive electrodes for the capacitive sensor allows a capacitive touch screen to be implemented as a single, integrated device rather than two separate devices that are attached or mounted one above the other. It also allows for a reduction of one substrate layer in the stack of layers as compared to the stack of layers required in a conventional approach to implementing a capacitive touch screen. Compared to conventional approaches and implementations, the capacitive touch screen with segmented Vcom electrode may: decrease overall thickness of a capacitive touch screen; reduce electrical interference between the display and the capacitive sensor; reduce total module cost due to the use of fewer substrates; reduce undesirable optical effects by eliminating many of the electrodes and/or the substrate conventionally required for implementing the capacitive sensor; and improve alignment between the capacitive sensor and the display.

Discussion will begin with a description of an exploded view of the layers of an example LCD, according to an embodiment. Each of the layers will be briefly described along with a basic description of the operation of an LCD. Discussion will continue with a description of an example implementation of a segmented Vcom electrode and two example implementations of capacitive sensor electrodes which operate using the segmented Vcom electrode (common voltage electrode segments) as drive electrodes. Some multiplexed embodiments will be briefly discussed. An example integrated display and touch sensor device will be described, as will some techniques for driving (both display and capacitive sensor) and sensing. The example integrated display and touch sensor device will then be further described in conjunction with discussion of an example method of capacitive sensing in a display, in accordance with the embodiments described herein.

Example Display Construction and Operation

Figure 1:
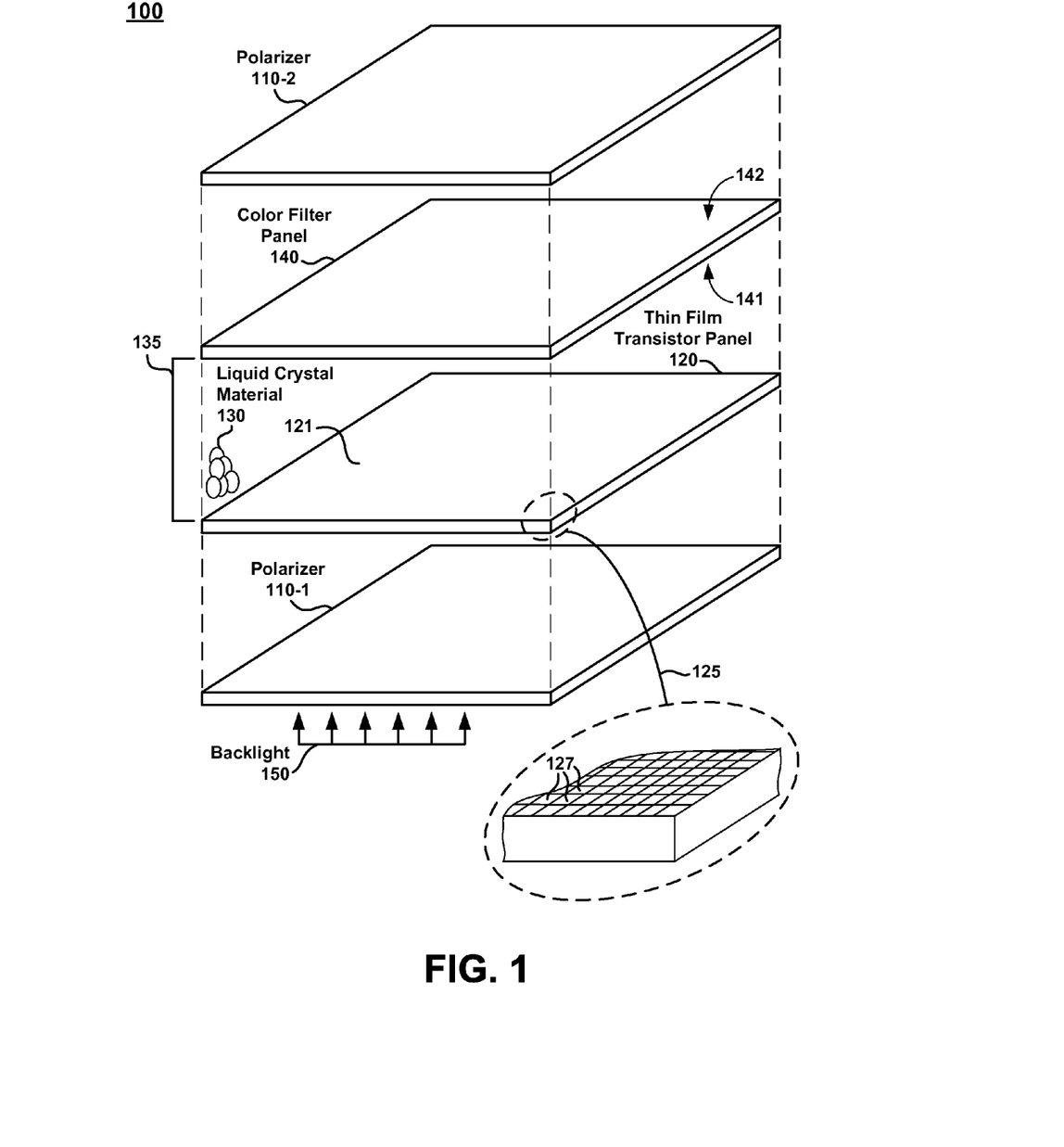
FIG. 1 is an exploded view of the stacked layers of an example Liquid Crystal Display (LCD), according to an embodiment.

FIG. 1 is an exploded view of the stacked layers of an example Liquid Crystal Display (LCD) 100, according to an embodiment. An LCD is utilized in this description for purposes of example and not of limitation. Thus, it is appreciated that the principles described herein with respect to LCDs are applicable to and extensible to other types of displays such as Organic Light Emitting Diode (OLED) displays, among others. In one embodiment, LCD 100 is a thin film transistor LCD. LCD 100 comprises a color filter panel 140, liquid crystal material 130, and a thin film transistor (TFT) panel 120 that are all located between polarizer 110-2 and polarizer 110-1. LCD 100 is backlit with a backlight 150 through its bottom layer, polarizer 110-1, and is viewed by a user through polarizer 110-2 which can be considered the top. TFT panel 120 and color filter panel 140 are sheets of glass (or other optically clear substrates) with the liquid crystal material 130 inserted and sealed between them in region 135. Polarizing filters (110-1, 110-2) on the two outer surfaces determine the polarization of light transmitted through the entire module of LCD 100, so that an electric field across liquid crystal material 130 can control the amount light transmitted through the LCD 100 from below by backlight 150. The details of how the polarized light interacts with liquid crystal material 130 are not relevant to the embodiments described here.

As shown by detail 125 of FIG. 1, TFT panel 120 is patterned with an array 127 of pixel transistors and transparent pixel electrodes on its upper surface 121, adjacent to liquid crystal material 130. In color LCDs, groups of pixel-sized red, green, and blue filters on color filter panel 140 are located above groups of three adjacent pixels. Sometimes these individual colored pixels, made up of a pixel transistor and a pixel electrode, are referred to as "sub-pixels," and each group of three is simply referred to as a "display pixel". The gates of the pixel transistors are driven by row wires traversing TFT panel 120, such that all of the gates of the pixel transistors in a single row are driven by the same row wire. A group of display pixels in such a row is referred to herein as a "pixel row." Similarly, column wires connect to the source terminals of the pixel transistors, such that all of the source terminals of the pixel transistors in a single column are driven by the same column wire. Each pixel electrode can be driven to a desired voltage by enabling its pixel transistor via an appropriate voltage on the corresponding row wire and driving the desired voltage onto the corresponding column wire.

In a conventional embodiment, color filter panel 140 contains a single "common" transparent electrode on its lower surface 141, adjacent to liquid crystal material 130, and no electrodes on its upper surface 142. This common electrode spans the entire display area and is driven with a voltage, typically referred to as "Vcom", and the common electrode is sometimes referred to as the Vcom electrode. Each individual pixel electrode voltage on TFT panel 120, in combination with the Vcom voltage on the Vcom electrode, creates an electric field across a local region of liquid crystal material 130, thus controlling the transparency of a single display pixel. As will be described further herein, this conventional arrangement is modified herein to segment the Vcom electrode into a plurality of common voltage electrode segments.

In operation, an LCD 100 is typically refreshed one row at a time, by driving the desired row wire and then driving the desired pixel voltages for that row onto all of the column wires at the same time. Once the row has been refreshed, the next row wire is selected and the process repeats until the entire display frame of LCD 100 has been refreshed.

Figure 6:
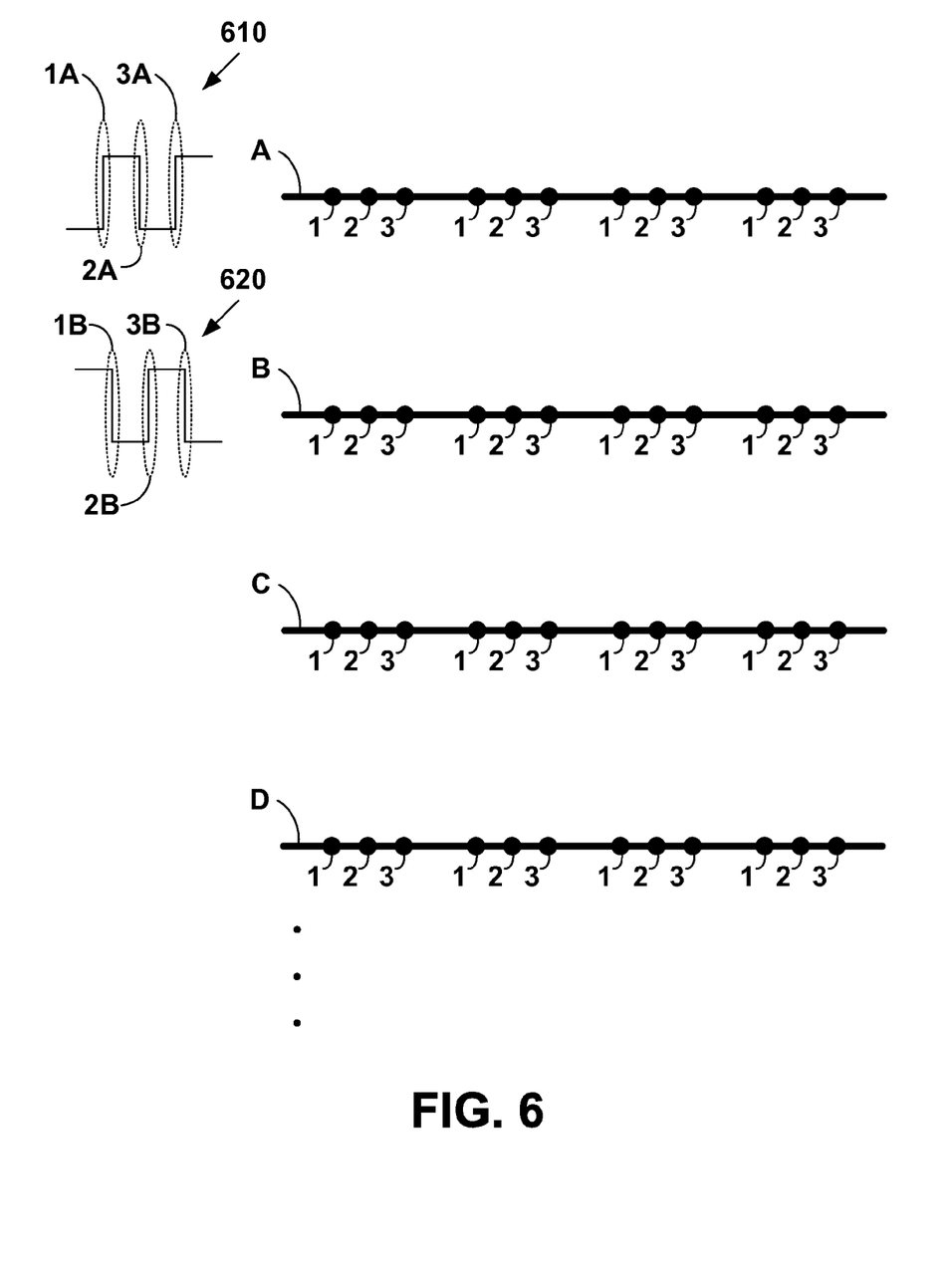
FIG. 6 shows example Vcom waveforms that can be used for refreshing pixel rows of an integrated display and for sensing with touch sensor device, in accordance with various embodiments.

For reasons not directly relevant to the embodiments described herein, the Vcom electrode is often alternated in voltage so that alternating pixel rows of the display pixels are driven with fields of alternating polarity, in a scanning method known as row inversion. On alternate frames, the polarities of the even and odd pixel rows are reversed, so that over time the average voltage across each pixel sums to zero. An example of this sort of modulation and row inversion is illustrated in FIG. 6.

Example Segmented Common Voltage Electrode

Figure 2:
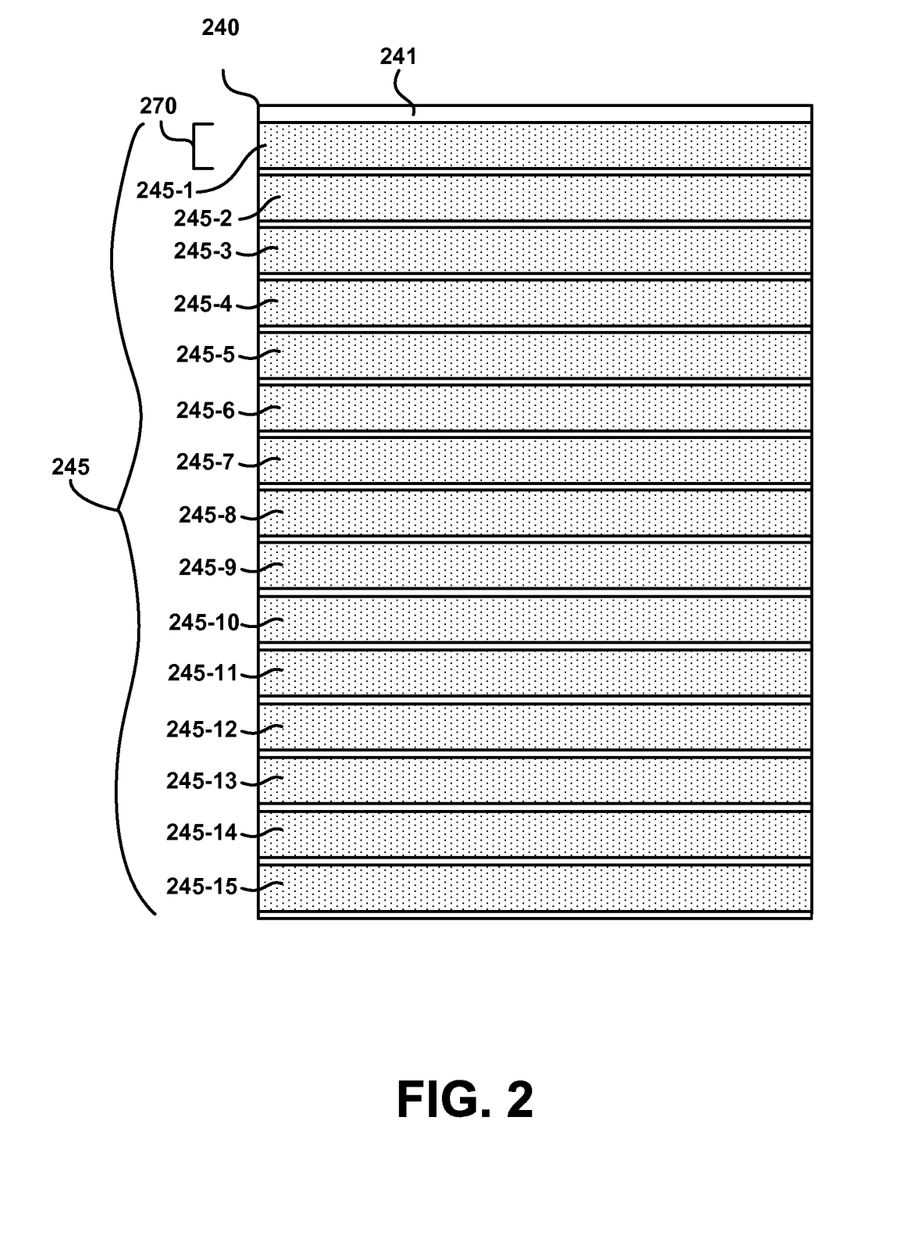
FIG. 2 is a plan view of an example substrate that includes a segmented common voltage (Vcom) electrode, according to an embodiment.

FIG. 2 is a plan view of substrate 240 that includes a segmented common voltage (Vcom) electrode 245, according to an embodiment. In one embodiment, substrate 240 is a substrate in the stack up of a display. For example, in one embodiment, substrate 240 is a color-filter panel, such as color filter panel 140 of FIG. 1. Vcom electrode 245 has been segmented into a plurality of horizontal segments (common voltage electrode segments 245-1 through 245-15 in the illustrated example). In one embodiment, each of the common voltage electrode segments (245-1 through 245-15) comprises an elongated shape, and the elongated shapes are substantially parallel to one another. As illustrated in detail 125, pixels in array 127 are very small. Thus, each segment, such as common voltage electrode segment 245-1, may have sufficient size to span or overlap more than one row of pixels. Thus, the total number of segments of a segmented Vcom electrode can be smaller than the number of display pixel rows in some embodiments.

With this arrangement, utilizing a segmented Vcom electrode 245, it is no longer necessary, as it was with an unsegmented Vcom electrode, to transition the voltage on the entire unsegmented Vcom electrode, but only on the segment, such as common voltage electrode segment 245-1, that is directly above the row of pixels to be refreshed. It is appreciated that, in one embodiment, this arrangement reduces the power required to transition the voltage on the individual common voltage electrode segments, in comparison to the power required to transition the voltage on a conventional unsegmented Vcom electrode. This power reduction occurs because each segment (e.g., 245-1) of segmented Vcom electrode 245 has only a fraction of the capacitance of an entire unsegmented Vcom electrode. Thus, transitioning a voltage on one segment of segmented Vcom electrode 245 or some subset (less that all) of the segments of segmented Vcom electrode 245 requires less power than transitioning a voltage on an entire unsegmented Vcom electrode.

It is appreciated that, in one embodiment, the bulk of the cost of this modification to segment the Vcom electrode is in additional pins and circuitry on the driver chip that drives the display. The additional pins and circuitry allow for individual connections to the multiple common voltage electrode segments (245-1 to 245-15 in this example) that are disposed on substrate 240. In some embodiments, the common voltage electrode segments may be driven by thin film transistors fabricated directly on the same substrate containing the common voltage electrode segments, reducing the required number of pins on the driver chip. Additionally, a patterning step is typically utilized to form the segmented Vcom electrode 245.

With continued reference to FIG. 2, consider a particular embodiment where each segment of segmented Vcom electrode 245, such as common voltage electrode segment 245-1, is 5 mm in height 270 and spans the width of the display on substrate 240. A typical high-quality TFT LCD display for use in high-end smart phones, for example, might have a pixel pitch of 0.156 mm. Thus, in an embodiment using such a TFT LCD, each segment of segmented Vcom electrode 245, such as common voltage electrode segment 245-1, spans 32 rows of pixels. If such an LCD has 480 rows of pixels and a frame refresh rate of 30 Hz, then each row must be updated within about 69 μs. This means that 32 Vcom voltage transitions occur on the first common voltage electrode segment (e.g., 245-1, or the segment over the first 32 rows of pixels) before moving on to the next common voltage electrode segment (e.g., 245-2) and the next 32 rows of pixels. This works out to a Vcom voltage transition frequency of a bit over 14 kHz, which not coincidentally is the same rate required for row inversion modulation with a conventional LCD using an unsegmented Vcom electrode.

It may appear that the resistance of long, narrow common voltage electrode segments (e.g., 245-1) creates an electrical settling time issue during the refresh of the display. However, as displays that utilize an unsegmented Vcom electrode can be refreshed at the necessary frequency for operating a display such as LCD 100, this does not seem to present an issue. For example, with respect to an unsegmented Vcom electrode, such an unsegmented electrode has a total capacitance, C, to the material beneath it, and a resistance of $\rho W/H$, where $\rho$ is the sheet resistance of the Vcom electrode, W is the width of the display, and H is the height of the display. Thus, the RC time constant of the unsegmented Vcom electrode is $C\rho W/H$.

For one common voltage electrode segment (e.g., 245-1), its capacitance is a fraction of that of an unsegmented Vcom electrode, or $Ch/H$, where h is the height of the segment (e.g., height 270 as shown in FIG. 2). The effective resistance, if driven from one end, such as the left end, is $\rho W/h$, so the RC time constant is $C\rho W/H$. This is the same result as for an unsegmented Vcom electrode. Thus, it is appreciated that segmenting the Vcom electrode will not necessarily create a settling time issue.

Figure 3:
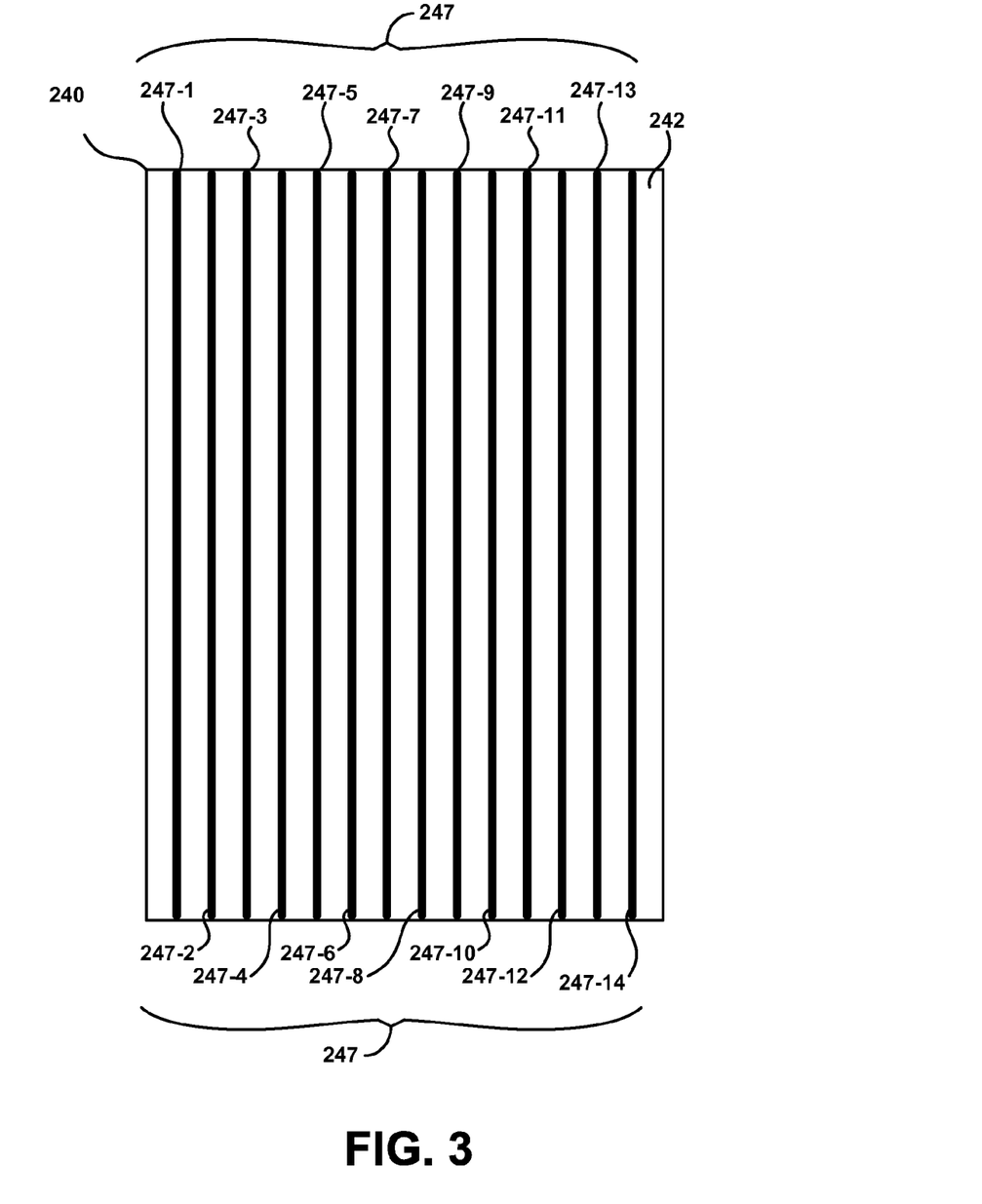
FIG. 3 is a plan view of an example substrate that includes an overlay of capacitive sensor electrodes, according to an embodiment.

Example Capacitive Touch Sensor Implemented in Conjunction with a Segmented Common Voltage Electrode FIG. 3 is a plan view of an example substrate 240 that includes an overlay of capacitive "receiver sensor electrodes" 247, according to an embodiment.

Figure 4:
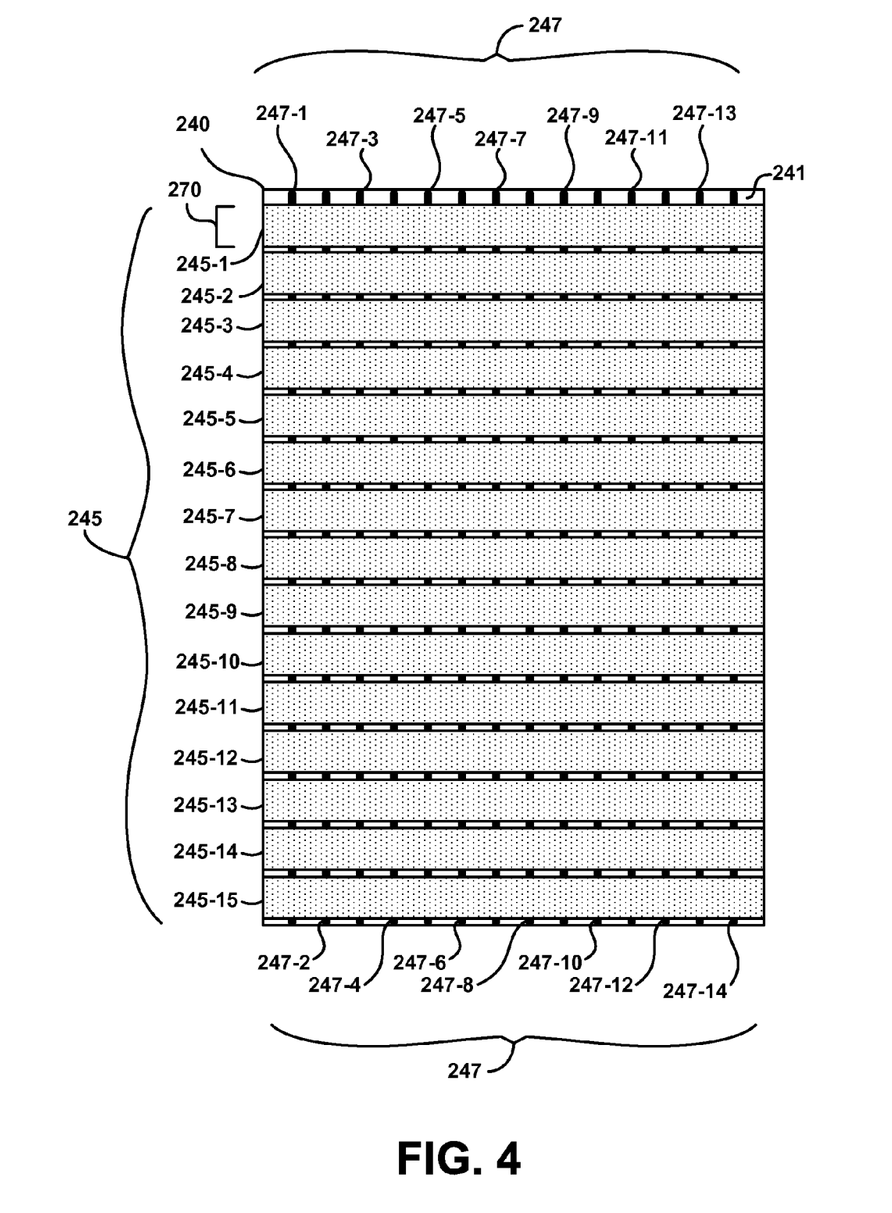
FIG. 4 is a plan view of an example substrate that includes an overlay of capacitive sensor electrodes and a segmented Vcom electrode, according to an embodiment.

FIG. 4 is a plan view of an example substrate 240 that includes an overlay of receiver sensor electrodes 247 and a segmented Vcom electrode 245, according to an embodiment. As is illustrated, in one embodiment, the receiver sensor electrodes 247 are disposed such that they are substantially orthogonally oriented with respect to the segments of segmented Vcom electrode 245. With respect to a display, such as LCD 100 of FIG. 1, the receiver sensor electrodes 247 and segmented Vcom electrode 245 may be disposed on a single substrate (either on the same or opposing surfaces) or on different substrates. With respect to LCD 100, the substrates include polarizer 110-2, color filter panel 140, and in some embodiments a cover layer (not illustrated) that is not required for the function of the display portion of an integrated display and touch sensor device (such as device 500 of FIG. 5). Other types or implementations of displays, other than LCD 100, may include different, fewer, or additional substrates.

With reference to FIGS. 3 and 4, in one embodiment, either side (241, 242) of substrate 240 can be overlaid with vertically-oriented receiver sensor electrodes 247 (shown as receiver sensor electrodes 247-1 to 247-14 in the illustrated examples).

As shown in FIG. 4, in one embodiment, receiver sensor electrodes 247 are patterned on surface 241 of substrate 240 before the segmented Vcom electrode 245 is deposited. With reference to FIG. 1, in one embodiment where substrate 240 is a color-filter panel such as color-filter panel 140, this comprises patterning receiver sensor electrodes 247 on lower surface 141 of color filter panel 140 before the segmented Vcom electrode 245 is deposited. In such an embodiment, if the common voltage electrode segments and the receiving electrodes need to cross each other, jumpers can be used at the intersections between the common voltage electrode segments and receiving electrodes as appropriate, to prevent the transmitting and receiving electrodes from ohmically contacting each other. Alternatively, an insulating layer can be disposed between the common voltage electrode segments and the receiving electrodes.

As shown in FIG. 3, in one embodiment, receiver sensor electrodes 247 are patterned on surface 242 of substrate 240 and segmented Vcom electrode 245 is deposited on surface 241. With reference to FIG. 1, in one embodiment where substrate 240 is a color-filter panel such as color-filter panel 140, this comprises receiver sensor electrodes 247 being patterned on the upper surface 142 of color filter panel 140 while the segmented Vcom electrode is patterned on the lower surface 141.

With continued reference to FIG. 1, in other embodiments, receiver sensor electrodes 247 can be patterned on one or more of the top and bottom surfaces of top polarizer 110-2.

In another embodiment, receiver sensor electrodes 247 are patterned on a separate glass, polyethylene terephtalate (PET), or similar substrate that is then laminated, adhered, or otherwise affixed to the outer top surface of an LCD module (e.g., as a cover layer). Although such an embodiment would require an extra substrate (as is used conventionally to combine capacitive sensors with displays such as LCD 100), the finished display would still utilize a segmented Vcom electrode and thus include some assembly efficiencies and reductions in optical impairment versus using an unsegmented Vcom electrode and separate sensor drive electrodes.

With the approach described herein using a segmented Vcom electrode, there is a much reduced possibility of electrical interference between the display and the touch sensor. This is because the Vcom drive waveform for refreshing the display and the touch sensor drive waveform can now be one and the same. Thus, a common voltage electrode segment such as 245-1 can also be referred to as a sensor drive electrode since it serves a dual purpose.

The segments of segmented Vcom electrode 245 now also serve as the row drive electrodes for capacitive sensing, eliminating one layer of transparent conductors compared to a conventional capacitive touch screen, reducing the cost, potentially reducing the module thickness, and improving the optical properties.

Furthermore, the Vcom electrode in a display, such as LCD 100, is typically driven with a wide voltage swing which may be on the order of 10 volts, using special high-voltage drive circuits on a display driver chip. This high voltage drive will give the capacitive touch sensor a much higher signal-to-noise ratio than would be available using a typical 3.3V touch sensor chip. This will improve the signal-to-noise ratio of the capacitive sensor.

Moreover, as the common voltage electrode segments double as drive electrodes for the capacitive sensor, the capacitive sensor drive electrodes will always be in good alignment with the pixel array, since the color filter panel itself is already required to be in good alignment. In one embodiment, this alignment ensures that the patterned breaks between common voltage electrode segments will fall between rows of pixels where they do not impact the optical properties of the display. Given such inherent alignment, optical index matching may not be required to make the segmented Vcom electrode patterning practically invisible. Thus, in one embodiment, each display pixel will fully reside beneath a single common voltage electrode segment, eliminating any display non-uniformity that might be caused by the patterning.

Multiplexing

Some LCD modules employ column multiplexing to reduce the number of traces that must be routed from the display driver chip to the column wires. The column multiplexors are typically fabricated directly on TFT panel 120 at the same time as the pixel transistors. As an example, an LCD module may employ 6-to-1 multiplexing, driving two pixels per row with a single wire, each pixel comprised of red, green, and blue sub-pixels. This particular configuration now requires 6 refresh sub-cycles per row in order to refresh all of the pixels in the row using the reduced number of routed traces. Typically, an unsegmented Vcom electrode would be held at a constant voltage during these sub-cycles. However, in the invention described herein, each common voltage electrode segment can be driven on a sub-cycle basis to achieve at least two desirable effects.

First, changing the voltage on a common voltage electrode segment across sub-cycles allows alternating the polarity of the pixel electric field from column to column, achieving display quality improvements associated with a drive technique known as point inversion. Furthermore, on each frame, any given pixel can be driven with an electric field that is opposite to that on the preceding frame, as well as being opposite to that of its neighbors.

Second, from the perspective of the touch sensor, the increased Vcom voltage transition frequency that can be associated with 6-to-1 multiplexing increases the potential sampling frequency from about 14 kHz to 84 kHz. Such an increased sampling frequency can improve the performance of the touch sensor.

Example Integrated Display and Touch Sensor Device

Figure 5:
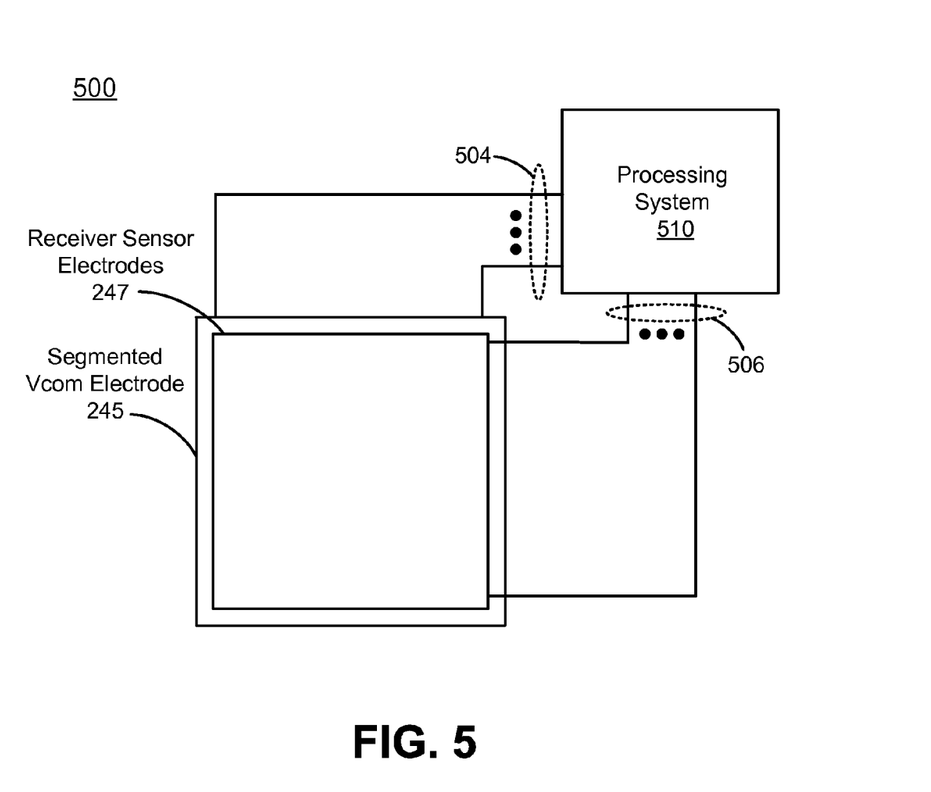
FIG. 5 is a plan view block diagram of an example integrated display and touch sensor device that can be implemented to include one or more embodiments of the present invention

FIG. 5 is a plan view block diagram of an example integrated display and touch sensor device 500 that can be implemented to include one or more embodiments of the present invention. Integrated display and touch sensor device 500 is interchangeably referred to herein as "device" 500. Device 500 can be utilized to communicate user input via an input object (e.g., a user's finger, a probe such as a stylus, and/or some other external input object) to a computing device or other electronic device.

When in operation, receiver sensor electrodes 247 and segmented Vcom electrode 245 are used in combination to form a "sensing region" for sensing input objects. "Sensing region" as used herein is intended to broadly encompass any space above, around, in and/or near device 500 wherein the receiver sensor electrodes 247 are able to detect an input object. In one embodiment, a sensing region extends from a surface of receiver sensor electrodes 247 in one or more directions into space until the noise and decreased signal prevent accurate object detection. This distance may be on the order of less than a millimeter, millimeters, centimeters, or more, and may vary significantly with the type of position sensing technology used and the accuracy desired. Accordingly, the planarity, size, shape and exact locations of the particular sensing regions can vary widely from embodiment to embodiment.

Sensing regions with rectangular projected shape are common, and many other shapes are possible. For example, depending on the design of the sensor pattern and surrounding circuitry, shielding from any input objects, and the like, sensing regions can be made to have two-dimensional projections of other shapes. Similar approaches can be used to define the three-dimensional shape of the sensing region. For example, any combination of sensor design, shielding, signal manipulation, and the like can effectively define a sensing region in the third dimension.

Device 500 can include a first set of a plurality of conductive routing traces 504 and a second set of a plurality of conductive routing traces 506 that are patterned (or formed)

as part of device 500. Conductive routing traces 504 are utilized, in one embodiment, to communicatively couple processing system 510 with segments of segmented Vcom electrode 245. Conductive routing traces 506 are utilized, in one embodiment, to communicatively couple processing system 510 with receiver sensor electrodes 247.

Receiver sensor electrodes 247 can be formed of a substantially transparent conductive material. Indium tin oxide (ITO) is one example of a substantially transparent conductive material that can be used to form one or more receiver sensor electrodes or conductive traces of receiver sensor electrodes 247. In FIGS. 1 and 5, a capacitive sensing reference surface or "cover layer" is not illustrated over receiver sensor electrodes 247, so as not to obscure other portions which are being discussed. However, it is appreciated that such a capacitive sensing reference surface, which may also be made of an optically clear material, may separate receiver sensor electrodes 247 from an input object. With reference to FIG. 1, in one embodiment, the capacitive sensing reference surface may be a polarizer, such as polarizer 110-2 of FIG. 1 when receiver sensor electrodes 247 are disposed on an opposite side of the polarizer 110-2 or on a layer below the polarizer 110-2, such as on color filter panel 140.

Referring again to FIG. 5, in one embodiment, processing system 510 drives one or more segments of segmented Vcom electrode 245 with a voltage that includes one or more voltage transitions. These transitions provide a common voltage for refreshing one or more display pixels of a display and also generate electrical signals on one or more receiver sensor electrode(s) 247 via capacitive coupling. Processing system 510 couples the one or more receiver sensor electrodes 247 to electronic circuits of processing system 510 to acquire one or more measurements of capacitance with respect to the capacitive coupling between the driven segment(s) of segmented Vcom electrode 245 and the receiver sensor electrodes 247. In one embodiment, processing system 510 may be coupled only to receiver sensor electrode(s) 247 but not to segmented Vcom electrode 245 (instead segmented Vcom electrode 245 may be driven by some other source such as a display driver). This driving from another source will still generate a signal on receiver sensor electrode(s) 247, which can be measured by processing system 510 in the same manner described above in order to acquire a measurement of the capacitive coupling between the driven segment(s) of segmented Vcom electrode 245 and the receiver sensor electrodes 247. In either of these embodiments, the signal that is driven on the segmented Vcom electrode can be used to provide a common voltage for refreshing pixel rows of the display portion of device 500 while simultaneously generating electrical signal(s) on receiver sensor electrode(s) 247 to facilitate capacitive sensing.

Such measurement(s) of capacitance by processing system 510 enable the sensing of input objects within the sensing region produced by the combination of segmented Vcom electrode 245 and receiver sensor electrodes 247. Such measurement(s) can also be utilized by processing system 510, in some embodiments, to determine positional information with respect to an input object relative to the sensing region and display of device 500. The positional information is relative to both the sensing region and the display, because the drive electrodes are integrated with the display and the sense electrodes are disposed over the display. Processing system 510 may be implemented as one or more integrated circuits and/or discrete components. In one embodiment, processing system 510 includes or is implemented within an application specific integrated circuit (ASIC). In accordance with the embodiments described herein, such an ASIC can include components and/or embedded logic instructions for performing capacitance measurement(s) and determining contact and/or positional information with respect to both a sensing region and display of device 500.

The positional information determined by processing system 510 can be any suitable indicia of object presence. For example, the processing system can be implemented to determine "zero-dimensional" 1-bit positional information (e.g., near/far or contact/no contact) or "one-dimensional" positional information as a scalar (e.g., position or motion along a sensing region). Processing system 510 can also be implemented to determine multi-dimensional positional information as a combination of values (e.g., two-dimensional horizontal/vertical axes, three-dimensional horizontal/vertical/depth axes, angular/radial axes, or any other combination of axes that span multiple dimensions), and the like. Processing system 510 can also be implemented to determine information about time or history.

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. The positional information from the processing system 510 facilitates a full range of interface inputs, including use of the proximity sensor device as a pointing device for cursor control, scrolling, and other functions.

It is noted that some example embodiments of patterns which may be used as receiver sensor electrodes 247 are described herein in FIGS. 3 and 4. It is also noted that some example embodiments of segmented Vcom electrode 245 are illustrated in FIGS. 2 and 4. It is appreciated that the examples of FIGS. 2, 3, and 4 are provided by way of example and not of limitation. In general, other segmented Vcom electrode 245 and receiver sensor electrode 247 patterns/combinations that provide zero-dimensional, one-dimensional, or two-dimensional sensing, and that follow the principles described herein, can also be used for measuring capacitance while the segments of segmented Vcom electrode 245 are also concurrently used for refreshing pixels of a display.

Operation of Capacitive Sensor Portion

With reference to FIG. 4 and to FIG. 5, it is appreciated that the typical operation of a capacitive sensor involves transitioning the voltage on the drive electrodes and sensing the resulting signal generated on the receiver sensor electrodes 247, otherwise known as the capacitive sensor electrodes. In a display, such as LCD 100, that includes the substrate 240 shown in FIG. 2 and FIG. 4, the drive electrodes for the capacitive sensor are the common voltage electrode segments, and the necessary drive electrode voltage transitions happen as a consequence of refreshing the display. All that then remains to perform capacitive sensing is for processing system 510 to measure the signal on the receiver sensor electrodes 247 synchronously with the Vcom transition rate of LCD 100.

In the example previously described above with respect to FIG. 4, there are 32 voltage transitions per common voltage electrode segment, and a capacitive sensor frame rate of 30 Hz. If a capacitive touch sensor requires a faster frame rate, it can easily be doubled or even quadrupled by simply changing the order in which the display rows of TFT pixels are refreshed. For example, processing system 510 can refresh all of the even pixel rows first and then all of the odd pixel rows, which will permit two complete capacitive sensing images to be collected during a single display frame refresh period of a display such as LCD 100. This yields only half as many voltage transitions per common voltage electrode segment during the capture of each capacitive sensing image, however it captures capacitive sensing images at twice the frame rate of LCD 100. In other embodiments, other groupings/subsets of pixels and/or pixel rows can be used to increase the capacitive sensor frame rate (i.e., the rate at which the capacitive images are captured).

It is appreciated that there are many variations to how common voltage electrode segments can be driven by processing system 510. With reference to FIGS. 4 and 5 and by way of example, and not of limitation, some of these variations are described below.

In one embodiment, processing system 510 drives a signal onto one common voltage electrode segment (e.g., 245-1) while all other common voltage electrode segments (e.g., 245-2 to 245-15) are held at a constant voltage, such as, for example, ground potential.

In another embodiment, processing system 510 drives a signal onto more than one common voltage electrode segment (e.g., 245-1 and 245-2) but fewer than all of the common voltage electrode segments, while the other common voltage electrode segments (e.g., 245-3 to 245-15) are held at a constant voltage. This can be accomplished by processing system 510 driving adjacent pairs (e.g., common voltage electrode segments 245-1 and 245-2, then common voltage electrode segments 245-3 and 245-4, and so forth) or by driving different combinations (e.g., common voltage electrode segments 245-1 and 245-3, then common voltage electrode segments 245-2 and 245-4, and so forth) or by driving overlapping combinations (e.g., common voltage electrode segments 245-1 and 245-2, then common voltage electrode segments 245-2 and 245-3, then common voltage electrode segments 245-3 and 245-4, and so forth).

In one embodiment, processing system 510 drives a signal simultaneously onto multiple common voltage electrode segments (e.g., common voltage electrode segments 245-1 and 245-2), wherein at least one of the common voltage electrode segments drives a signal having a different (opposite) phase from another common voltage electrode segment. In one such embodiment, the first phase being driven is used for LCD refreshing and the opposite phase is used to detect an object, such as a finger, that comes near or interacts with receiver sensor electrodes 247.

In another embodiment, processing system 510 drives a signal onto a set of drive electrodes (e.g., common voltage electrode segments 245-1 to 245-5) by driving a signal having a first phase on a first drive electrode (e.g., common voltage electrode segment 245-1), while driving a signal having a second phase on the other drive electrodes (e.g., common voltage electrode segments 245-2 through 245-5). Next, processing system 510 drives a signal having a first phase onto a second electrode of the set (e.g., common voltage electrode segment 245-2) while driving a signal having a second phase onto the other drive electrodes of the set (e.g., common voltage electrode segments 245-1, 245-3, 245-4, and 245-5). The rotation can be continued in this manner for all of the drive electrodes in the set.

In another embodiment, processing system 510 drives a signal having a first phase onto multiple drive electrodes from a set of drive electrodes (e.g., a set that consists of common voltage electrode segments 245-1 through 245-5). For example, in a first instance a first signal having a first phase is driven onto common voltage electrode segments 245-1 and 245-3, while a second signal with a second phase is driven onto common voltage electrode segments 245-2, 245-4, and 245-5. At a second instance, a first signal having a first phase is driven onto common voltage electrode segments 245-2 and 245-4 while a second signal having a second phase is driven onto common voltage electrode segments 245-1, 245-3, and 245-5. It is appreciated that the grouping of electrodes does not have to be alternating. In another example, in the first instance the first signal is driven onto common voltage electrode segments 245-1 and 245-2, and in the second instance the first signal is driven onto common voltage electrode segments 245-2 and 245-3, and in a third instance the first signal is driven onto common voltage electrode segments 245-3 and 245-4. It is appreciated that many different groupings of electrodes are possible and that the number of variations is related to the number of electrodes which are employed at a particular instance in time.

In one embodiment, processing system 510 drives signals having different frequencies onto different combinations of the segments of segmented Vcom electrode 245, instead of driving signals with different phases. It is appreciated that signals having differing frequencies and differing phases can be simultaneously driven as well.

In another embodiment, processing system 510 drives segments of segmented Vcom electrode 245 with a plurality of signals having a plurality of distinct digital codes (e.g., common voltage electrode segment 245-1 is driven with a signal of a first code, common voltage electrode segment 245-2 is driven with a signal of a second code, and so forth). Processing system 510 modulates a signal that is applied to at least one of the plurality of common voltage electrode segments to obtain a resultant signal on one or more receiver sensor electrodes 247 that is/are electrically affected by the position of an object with respect to the modulated common voltage electrode segments. The resultant signal is demodulated by processing system 510 by using the plurality of distinct digital codes that have been employed. The demodulation allows for discrimination of electrical effects produced by the object. The processing system 510 can then determine the position of the object with respect to a touch sensor from the electrical effects.

FIG. 6 shows example Vcom waveforms that can be used for refreshing pixel rows of an integrated display and touch sensor device, in accordance with various embodiments. In one embodiment, the example waveforms described in FIG. 6 can be used to drive common voltage electrode segments of an integrated display and touch sensor device, in accordance with the methods described above related to column multiplexing. A plurality of pixel rows (A, B, C, D) of a display, such as of LCD 100, are illustrated. Each pixel row has sets of red, blue and green pixels. In FIG. 6, sub-pixels labeled "1" represent red sub-pixels; sub-pixels labeled "2" represent blue sub-pixels; and sub-pixels labeled "3" represent green sub-pixels. On any particular pixel row, all of the sub-pixels of a particular color (red, blue, or green) can be referred to as a subset of pixels. Thus all of the sub-pixels on a pixel row that are labeled "1" make up one subset of pixels; all of the sub-pixels on a pixel row that are labeled "2" make up another subset of pixels; and all of the sub-pixels on a pixel row that are labeled "3" make up yet another subset of pixels. Two Vcom voltage signals 610 and 620 are illustrated. Vcom voltage signal 610 has voltage transitions: 1A, 2A, and 3A. Vcom voltage signal 620 has voltage transitions 1B, 2B, and 3B.

In one embodiment, processing system 510 drives Vcom voltage signal 610 onto at least one common voltage electrode segment (e.g., 245-1). With respect to pixel row A, this drives a first transition, 1A, to provide a first common voltage to refresh a first subset of pixels, 1; drives a second transition, 2A, to provide a second common voltage to refresh a second subset of pixels, 2; and drives a third transition, 3A, to provide a third common voltage to refresh a third subset of pixels, 3. Processing system 510 then drives Vcom voltage signal 620 onto at least one common voltage electrode segment (e.g., 245-2). With respect to pixel row B, this drives a first transition, 1B, to provide a first common voltage to refresh a first subset of pixels, 1; drives a second transition, 2B, to provide a second common voltage to refresh a second subset of pixels, 2; and drives a third transition, 3B, to provide a third common voltage to refresh a third subset of pixels, 3. The process can then repeat for pixel rows C and D.

As illustrated, signal 620 is an inverted version of signal 610. This is an example of row inversion. "A" transitions are completed on pixel row A, then "B" transitions (inverted "A" transitions) are completed on pixel row B. Rows are refreshed sequentially, wherein sequentially means one then another but does not necessarily imply any order. Even though 3 pixel subsets are shown, there could be fewer or more. However, 3 subsets is a common example (as is 6) in conventional displays in which the technology herein may be integrated. As shown, it is common to refresh all red sub-pixels together, all blue sub-pixels together, and all green sub-pixels together on a given pixel row. It is appreciated that during the full refresh period for each pixel row, three measurements of capacitive coupling can be taken with receiver sensor electrodes 247 that are located above the driven common voltage electrode segment(s). This can result in a higher sample rate and improve the signal to noise ratio over sampling only once during the refresh period of each pixel row.

In other embodiments, the pixel rows can be driven in other orders, such as in pixel subsets. For example odd rows (A, C, etc.) can be grouped into a first subset of pixels while even rows of (B, D, etc.) are grouped into a second subset of pixels. In one embodiment, rows of a first subset of pixels can be sequentially driven in the described manner or in other manners, and then rows of a second subset of pixels can be driven. It is appreciated that there can be other types of pixel subsets.

Example Method of Capacitive Sensing in a Display

Figure 7:
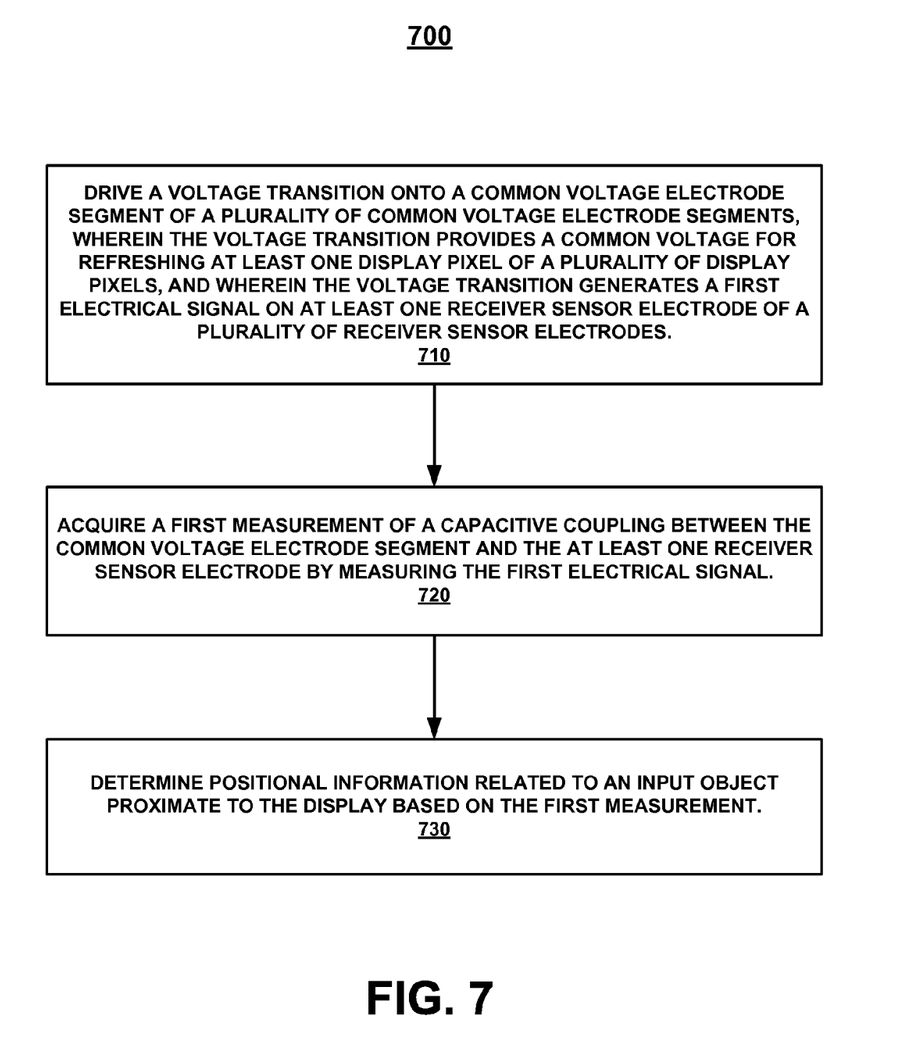
FIG. 7 is a flow diagram of an example method of capacitive sensing in a display, according to an embodiment.

The following discussion sets forth in detail the operation of example methods of operation of embodiments. With reference to FIG. 7, flow diagram 700 illustrates example procedures used by various embodiments. Flow diagram 700 includes some procedures that, in various embodiments, are carried out by a processor such as an ASIC under the control of computer-readable and computer-executable instructions. In this fashion, all or part of flow diagram 700 can be implemented using a computer or processing system, such as processing system 510, in various embodiments. The computer-readable and computer-executable instructions can reside in any tangible computer readable storage media, such as, for example, memory, logic, and/or silicon of or coupled with processing system 510. These computer-readable and computer-executable instructions are used to control or operate in conjunction with, for example, some portion of processing system 510, such as a processor or ASIC. Although specific procedures are disclosed in flow diagram 700, such procedures are examples. That is, embodiments are well suited to performing various other procedures or variations of the procedures recited in flow diagram 700 and described below. Likewise, in some embodiments, the procedures in flow diagram 700 (along with those described below) may be performed in an order different than presented and/or not all of the procedures described in flow diagram 700 may be performed.

FIG. 7 is a flow diagram 700 of an example method of capacitive sensing in a display, according to an embodiment. Flow diagram 700 describes a method of operation of an integrated display and touch sensor device 500, according to one embodiment. Elements of flow diagram 700 are described below, with reference to elements of FIGS. 1-6.

At 710 of flow diagram 700, in one embodiment, a voltage transition is driven onto at least one common voltage electrode segment of a plurality of common voltage electrode segments of the display. The voltage transition provides a common voltage for refreshing at least one display pixel of a plurality of display pixels of the display. The voltage transition also generates a first electrical signal on at least one receiver sensor electrode of a plurality of receiver sensor electrodes. It is appreciated that in one embodiment, this voltage transition is driven by processing system 510. For example, with reference to FIGS. 4 and 5, in one embodiment, this comprises processing system 510 driving a voltage transition, such as a transition from one voltage potential to another voltage potential on a common voltage electrode segment (e.g., common voltage electrode segment 245-1). Various techniques for accomplishing this driving are described herein with respect to FIGS. 4 and 5, and reference is made thereto.

At 720 of flow diagram 700, in one embodiment, a first measurement is acquired of a capacitive coupling between the at least one common voltage electrode segment (being driven) and the at least one receiver sensor electrode by measuring the first electrical signal on the at least one receiver sensor electrode. In one embodiment, processing system 510 acquires this measurement of capacitive coupling by integrating charge flowing onto the at least one receiver sensor electrode(s) 247 in response to the signal driven onto the common voltage electrode segment. For example, this can comprise using a charge integrator or portion of an ASIC of processing system 510 to integrate the charge on receiver sensor electrode 247-1, and thus determine a capacitance.

At 730 of flow diagram 700, in one embodiment, the method determines positional information related to an input object proximate to the touch screen of a display based on the first measurement. In one embodiment, this comprises processing system 510 determining this positional information. Once measurements of capacitive coupling have been obtained, conventional methods of determining position information can be utilized.

In one embodiment, the method of flow diagram 700 further comprises driving a second voltage transition onto a second common voltage electrode segment to provide a second common voltage for refreshing a second at least one display pixel of the plurality of display pixels. The second voltage transition generates a second electrical signal on at least one receiver sensor electrode of the plurality of receiver sensor electrodes. In one embodiment, the driving of the voltage transition and the driving of the second voltage transition occur sequentially. By "sequentially," what is meant is one following another; however, no particular order of driving of common voltage electrode segments is implied by the word "sequentially." In one embodiment, this comprises processing system 510 driving a second common voltage electrode, such as common voltage electrode segment 245-2 or 245-3 with a second voltage transition. The second voltage transition may be the same or different from the first voltage transition. In one embodiment, the second voltage transition is an inverted version of the first voltage transition.

In one embodiment the plurality of display pixels are arranged in a plurality of pixel subsets (e.g., at least a first subset of pixels and a second subset of pixels). In one such embodiment, the method of flow diagram 700 further comprises: acquiring a first capacitive image during a first time period; and acquiring a second capacitive image during a second time period. The first capacitive image is acquired during the first time period by driving at least one voltage transition onto each common voltage electrode segment of the plurality of common voltage electrode segments. This set of voltage transitions also provides a plurality of common voltages for refreshing the first subset of pixels. The second capacitive image is acquired during a second time period by driving at least one voltage transition onto each common voltage electrode segment of the plurality of common voltage electrode segments. This second set of voltage transitions also provides a plurality of common voltages for refreshing the second subset of pixels. In one embodiment, the first and second subsets of pixels are different from one another. In one embodiment, the first subset of pixels includes all even pixel rows and the second subset of pixels includes all odd pixel rows. With reference to FIG. 6, in one embodiment, this can comprise a plurality of pixel rows (A, B, C, D) being divided into subsets of pixels such as odd rows (A, C) and even rows (B, D). During a first time period, processing system 510 sequentially drives the common voltage electrode segments associated with the rows of the first subset of pixels and captures a capacitive image from measurements of capacitive coupling taken from receiver sensor electrodes 247 during the first time period. During a second time period, processing system 510 sequentially drives the common voltage electrode segments associated with the rows of the second subset and captures a capacitive image from measurements of capacitive coupling taken from receiver sensor electrodes 247 during the second time period. It is appreciated that other subsets of pixels are possible such as every other pair of pixel rows, every third pixel row, every fourth pixel row, like colored pixels on all rows (all red pixels, all blue pixels, or all green pixels), and the like. It is also appreciated that the term "sequentially," as used herein, means one and then another, but does not necessarily imply an order. The end result of this method is that capacitive sensor images are captured at a higher frame rate than the display refresh frame rate, typically at an integer multiple of that rate.

In one embodiment, the plurality of display pixels are arranged in a plurality of pixel rows where a first pixel row of the plurality of pixel rows comprises at least a first and second subset of pixels, and the method of flow diagram 700 further comprises: driving a voltage transition to provide the common voltage for refreshing the first subset with a first polarity; and sequentially driving a second voltage transition to provide a second common voltage for refreshing the second subset with a second polarity. In one embodiment, processing system 510 drives the first and second voltage transitions. FIG. 6 shows an example of a pixel row A that is split into three pixel subsets (1, 2, and 3). In the example of FIG. 6, processing system 510 drives Vcom voltage signal 610 which includes a first voltage transition 1A for refreshing first subset of pixels 1, a second voltage transition 2A for refreshing second subset of pixels 2, and a third voltage transition 3A for refreshing third subset of pixels 3.

The foregoing descriptions of specific embodiments have been presented for purposes of illustration and description. They are not intended to be exhaustive or to limit the presented technology to the precise forms disclosed, and obviously many modifications and variations are possible in light of the above teaching. The embodiments were chosen and described in order to best explain the principles of the presented technology and its practical application, to thereby enable others skilled in the art to best utilize the presented technology and various embodiments with various modifications as are suited to the particular use contemplated. It is intended that the scope of the present technology be defined by the claims appended hereto and their equivalents.

What is claimed is:

1. An integrated display and touch sensor device comprising:
   a plurality of common voltage electrode segments;
   a plurality of display pixels configured for displaying information on said display;
   a plurality of receiver sensor electrodes; and
   a processing system communicatively coupled with said plurality of common voltage electrode segments and with said plurality of receiver sensor electrodes, wherein said processing system is configured for:
      driving a voltage transition onto a common voltage electrode segment of said plurality of common voltage electrode segments, wherein said voltage transition comprises a transition from a first voltage to a second voltage, wherein said voltage transition provides a common voltage for refreshing at least one display pixel of said plurality of display pixels, and wherein said voltage transition simultaneously generates a first electrical signal on at least one receiver sensor electrode of said plurality of receiver sensor electrodes; and
      acquiring a first measurement of a capacitive coupling between said common voltage electrode segment and said at least one receiver sensor electrode by measuring said first electrical signal.

2. The integrated display and touch sensor device of claim 1, wherein said processing system is further configured for:
   determining positional information related to an input object based on said first measurement.

3. The integrated display and touch sensor device of claim 1, wherein said processing system is further configured for driving a second voltage transition onto a second common voltage electrode segment to provide a second common voltage for refreshing a second at least one display pixel of said plurality of display pixels, wherein said second voltage transition generates a second electrical signal on said at least one receiver sensor electrode of said plurality of receiver sensor electrodes, and wherein said driving a voltage transition and said driving a second voltage transition occur sequentially.

4. The integrated display and touch sensor device of claim 1, wherein said plurality of display pixels comprises first and second subsets of pixels and wherein said processing system is further configured for:
   acquiring a first capacitive image during a first time period by driving a first plurality of voltage transitions, wherein said first plurality of voltage transitions comprises said voltage transition driven onto said common voltage electrode segment of said plurality of common voltage electrode segments, wherein at least one voltage transition of said first plurality of voltage transitions is driven onto each common voltage electrode segment of said plurality of common voltage electrode segments, and wherein said first plurality of voltage transitions provides a plurality of common voltages for refreshing said first subset of pixels; and
   acquiring a second capacitive image during a second time period by driving a second plurality of voltage transitions, wherein at least one voltage transition of said second plurality of voltage transitions is driven onto each common voltage electrode segment of said plurality of common voltage electrode segments, wherein said second plurality of voltage transitions provides a plurality of common voltages for refreshing said second subset of pixels, and wherein said first and said second subset of pixels are different.

5. The integrated display and touch sensor device of claim 4, wherein said first subset of pixels includes all even pixel rows and said second subset of pixels includes all odd pixel rows.

6. The integrated display and touch sensor device of claim 1, wherein said plurality of display pixels are arranged in a plurality of pixel rows, wherein a first pixel row of said plurality of pixel rows comprises first and second subsets of pixels,
wherein said driving said voltage transition onto said common voltage electrode segment of said plurality of common voltage electrode segments comprises providing said common voltage for refreshing said first subset with a first polarity, and wherein said processing system is further configured for:
driving a second voltage transition to provide a second common voltage for refreshing said second subset with a second polarity, wherein said first and said second voltage transitions are sequentially driven.

7. The integrated display and touch sensor device of claim 1, wherein said plurality of display pixels is arranged in a plurality of pixel rows and wherein said common voltage electrode segment has a sufficient size to overlap more than one of said plurality of pixel rows.

8. The integrated display and touch sensor device of claim 1, wherein said plurality of common voltage electrode segments comprises a plurality of substantially parallel elongated shapes; and
wherein said plurality of receiver sensor electrodes is disposed in a substantially orthogonal orientation to said plurality of common voltage electrode segments.

9. The integrated display and touch sensor device of claim 1, wherein said plurality of common voltage electrode segments is disposed on a first substrate and said plurality of receiver sensor electrodes is disposed on a second substrate.

10. The integrated display and touch sensor device of claim 9, wherein said second substrate is a polarizer of said display.

11. The integrated display and touch sensor device of claim 1, wherein said plurality of common voltage electrode segments is disposed upon a first surface of a substrate and said plurality of receiver sensor electrodes is disposed on a second surface of said substrate.

12. The integrated display and touch sensor device of claim 11, wherein said substrate is a color filter panel of said display.

13. The integrated display and touch sensor device of claim 1, wherein said plurality of common voltage electrode segments and said plurality of receiver sensor electrodes are disposed upon a first surface of a substrate.

14. The integrated display and touch sensor device of claim 13, wherein said substrate is a color filter panel of said display.

15. The integrated display and touch sensor device of claim 1, wherein said driving a voltage transition onto a common voltage electrode segment of said plurality of common voltage electrode segments comprises:
driving said voltage transition on a subset of more than one but less than all of said plurality of common voltage electrode segments during a first period of time.

16. A device comprising:
a plurality of receiver sensor electrodes;
a plurality of common voltage electrode segments, wherein a common voltage electrode segment of said plurality of common voltage electrode segments is configured to be driven with a voltage transition that provides a common voltage for refreshing a subset of display pixels of a display and wherein said voltage transition simultaneously generates a plurality of electrical signals on a plurality of receiver sensor electrodes, wherein said voltage transition comprises a transition from a first voltage to a second voltage; and
a processing system communicatively coupled with said plurality of receiver sensor electrodes, wherein said processing system is configured for:
acquiring a plurality of measurements of a plurality of capacitive couplings between said common voltage electrode segment and said plurality of receiver sensor electrodes by measuring said plurality of electrical signals; and
determining positional information related to an input object proximate to said display based on said plurality of measurements.

17. The device of claim 16, wherein display pixels of said display are arranged in a plurality of pixel rows and wherein said common voltage electrode segment has a sufficient size to overlap more than one of said plurality of pixel rows.

18. The device of claim 16, wherein said plurality of common voltage electrode segments comprises a plurality of substantially parallel elongated shapes; and
wherein said plurality of receiver sensor electrodes is disposed in a substantially orthogonal orientation to said plurality of common voltage electrode segments.

19. The device of claim 16, wherein said plurality of common voltage electrode segments is disposed on a first substrate and said plurality of receiver sensor electrodes is disposed on a second substrate.

20. The device of claim 16, wherein said plurality of common voltage electrode segments and said plurality of receiver sensor electrodes are both disposed on the same substrate.

21. A method of capacitive sensing in a display, said method comprising:
driving a voltage transition onto at least one common voltage electrode segment of a plurality of common voltage electrode segments of said display, wherein said voltage transition comprises a transition from a first voltage to a second voltage, wherein said voltage transition provides a common voltage for refreshing at least one display pixel of a plurality of display pixels of said display, and wherein said voltage transition simultaneously generates a first electrical signal on at least one receiver sensor electrode of a plurality of receiver sensor electrodes;
acquiring a first measurement of a capacitive coupling between said at least one common voltage electrode segment and said at least one receiver sensor electrode by measuring said first electrical signal; and
determining positional information related to an input object proximate to said display based on said first measurement.

22. The method as recited in claim 21, further comprising driving a second voltage transition onto a second common voltage electrode segment to provide a second common voltage for refreshing a second at least one display pixel of said plurality of display pixels, wherein said second voltage transition generates a second electrical signal on at least one receiver sensor electrode of said plurality of receiver sensor electrodes, and wherein said driving a voltage transition and driving a second voltage transition occur sequentially.

23. The method as recited in claim 21, wherein said plurality of display pixels comprises first and second subsets of pixels, and wherein said method further comprises:

acquiring a first capacitive image during a first time period by driving a first plurality of voltage transitions, wherein said first plurality of voltage transitions comprises said voltage transition driven onto said at least one common voltage electrode segment of said plurality of common voltage electrode segments, wherein at least one voltage transition of said first plurality of voltage transitions is driven onto each common voltage electrode segment of said plurality of common voltage electrode segments, and wherein said first plurality of voltage transitions provides a plurality of common voltages for refreshing said first subset of pixels; and acquiring a second capacitive image during a second time period by driving a second plurality of voltage transitions, wherein at least one voltage transition of said second plurality of voltage transitions is driven onto each common voltage electrode segment of said plurality of common voltage electrode segments, wherein said second plurality of voltage transitions provides a plurality of common voltages for refreshing said second subset of pixels, and wherein said first and said second subset of pixels are different.

24. The method as recited in claim 21, wherein said plurality of display pixels are arranged in a plurality of pixel rows, wherein a first pixel row of said plurality of pixel rows comprises first and second subsets of pixels, wherein said driving said voltage transition onto at least one common voltage electrode segment of said plurality of common voltage electrode segments comprises providing said common voltage for refreshing said first subset with a first polarity; and wherein said method further comprises:

driving a second voltage transition to provide a second common voltage for refreshing said second subset with a second polarity, wherein said first and said second voltage transitions are sequentially driven.

25. The method as recited in claim 21, wherein said driving a voltage transition onto at least one common voltage electrode segment of a plurality of common voltage electrode segments of said display comprises:

driving said voltage transition on a subset of more than one but less than all of said plurality of common voltage electrode segments during a first period of time.